Figure 1:
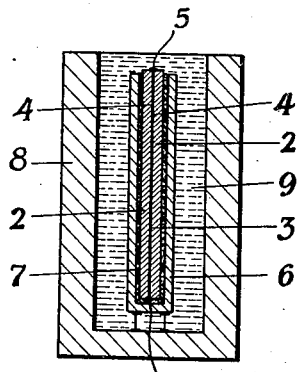

Oct. 18, 1938.  F. F. GORDON  2,133,293

MANUFACTURE OF COMPOUND METAL BODIES

Filed May 26, 1937

FREDERICK FELIX GORDON, Inventor

BY

Attorneys

Patented Oct. 18, 1938

2,133,293

UNITED STATES PATENT OFFICE 2,133,293

MANUFACTURE OF COMPOUND METAL BODIES

Frederick Felix Gordon, Sheffield, England

Application May 26, 1937, Serial No. 144,904
In Great Britain April 12, 1934

7 Claims. (Cl. 22—206)

This application is a continuation in part of my copending application Serial No. 740,184, filed August 16, 1934.

This invention relates to the manufacture of compound metal bodies, i. e., bodies consisting of layers of metals bonded (i. e. united) together by placing a bonding material between the surfaces to be united and effecting the union of said surfaces by means of heat or heat and pressure. The invention is applicable to the bonding one to another of ordinary irons and steels and alloyed irons and steels to form compound plates, sheets, slabs, billets, ingots or other products and is particularly useful for the bonding of such types of metals as low and high carbon steels, high speed steels and corrosion resisting (for example stainless and rustless) irons and steels, but its application is not limited thereto as it may be used for many other combinations of metals and alloys.

An object of the present invention is to provide an improved method of manufacture involving the use of a bonding material which will possess such mechanical strength that the compound body as a whole will be "workable", i. e., capable of being satisfactorily subjected to heat treatment, such as annealing, hardening or tempering and mechanical treatment such as rolling, forging, hammering or pressing or other similar operations to which metals and alloys may be subjected in the course of manufacture from blanks to semi-finished and finished products.

A further object of the invention is to provide an improved method of manufacture which will enable the compound metal bodies to be produced in large sizes, such as for example, large ingots from one ton in weight upwards.

According to this invention the bonding material must be one which must melt or be brought to a condition suitable for forming a satisfactory bond at a temperature which does not exceed 1400° C. and is not so high as to destroy the advantageous characteristics of or otherwise injure, the metals of the bodies to be bonded but which will not melt at the temperatures used for the subsequent hot working of the compound body, e. g., not below 1100° C.

As a result of my experiments I find that a bonding material consisting of the metal manganese alone or of a metal alloy or mixture of metals containing manganese as its essential and controlling constituent possesses the foregoing characteristics.

According to this invention the process for the manufacture of a compound metal body adapted to be subsequently worked consists in placing a separating material between the juxtaposed faces of two bodies, applying to each of the remote surfaces of the bodies a further metal body, interposing at the interfaces of the initial bodies and the further bodies a metallic bonding material in which the metal manganese is essential and when used with at least one other constituent has the lowest melting point of any, enveloping the resultant assembly with molten metal to autogenously weld to said assembly and applying pressure to the resultant product while in a heated condition.

The assembly may be heated and pressed prior to being enveloped with molten metal. The pressure is applied whilst the bodies are hot either from the process or from subsequent reheating and may be applied in any suitable manner, as for example, by press, rolls or hammer.

The manganese may be used with one or more of the metals nickel, iron, cobalt and chromium.

When manganese is used with nickel, iron, cobalt or chromium or any combination of these four latter metals, I get more satisfactory results with a range of mixtures containing from about 98% manganese down to a mixture containing about 10% of manganese. This range of proportions is satisfactory for most working conditions. With a mixture having a somewhat lower percentage of manganese than 10% of the total it is still possible to obtain a bond which is sufficiently workable to satisfy certain of the practical requirements referred to although not capable of being worked to the same extent as a mixture containing higher percentages of manganese.

The most generally useful range however is that which has a manganese content of 90% down to 20% the balance being one or more of the metals nickel, iron, cobalt or chromium or any combination thereof.

The substances usually occurring as impurities in the metal or metals of the bonding material may be present.

The bonding material is preferably in powdered form, but it may be in granular or other solid form, e. g., in sheet or strip form or a combination of powdered form and sheet or strip form.

It is to be understood however that the manganese being the controlling element, a definite amount of at least 15% of manganese must be used when the bonding material consists of manganese and one or more of the other metals mentioned and is used in solid form in which the metals have previously been melted together.

Preferably however the manganese is employed either wholly or in part as free and uncombined (unalloyed) metal when used with one or more of the other metals.

With the bonding material a flux may be used such as borax, sodium or potassium fluoride or carbonate, resin, ammonium and zinc chlorides or any suitable mixture of these.

The bonding material previously referred to is, with the addition of about 8% of anhydrous borax or potassium fluoride and borax as a flux, found to be suitable for bonding corrosion resisting irons and steels and mild steels and irons, high carbon steels and corrosion resisting steels and irons; manganese steels and corrosion resisting irons and steels; and high speed steels and mild steels and irons.

The invention is applicable to the bonding of many types and compositions of irons and steels of which the following are typical examples:—

Corrosion resisting steels, corrosion resisting irons, high chromium nickel steels, manganese steels, nickel steels, ordinary alloy irons, irons, silico manganese steels, high speed steels, high chromium steels, mild steels, ordinary carbon steels, chromium steels, ordinary alloy steels, nickel chromium steels.

A sufficient quantity of the bonding material is used to provide a layer between the surfaces to be united and to substantially fill any spaces between the said surfaces.

When bonding high carbon steels to low carbon steels a temperature of about 1260° C. is suitable, with a bonding material composed of 80% manganese and 20% of nickel. For bonding high speed steels to ordinary steels a temperature of about 1320° C. is suitable with a bonding material composed of 50% of manganese, 20% of iron and 30% of nickel. For bonding corrosion resisting (for example stainless and rustless) irons or steels to ordinary irons and steels a temperature of about 1300° C. but not exceeding 1350° C. is suitable with a bonding material composed of 50% manganese, 17% iron, 17% cobalt and 16% chromium. In each of these three examples, a flux of anhydrous borax equal to about 8% of the total weight of the metallic bonding material is suitable.

I wish it to be understood that the three foregoing examples are given by way of illustration only and that the bonding materials referred to may in each case be varied over a wide range.

Whilst mechanical mixtures of the metals forming the bonding material may be made by taking a quantity of each of the several metals in powder form and then mixing them together it is obvious that in some cases the several metals forming the bonding material could be melted together and then afterwards reduced to powder or be granulated or take the form of turnings or be formed into sheets, strips or plates and used as such for the bonding material.

Referring to the drawing filed herewith and which, for the purpose of illustration, are diagrammatic only, Fig. 1 is a vertical section through a mould illustrating one form of carrying out the method of manufacturing compound bodies according to this invention.

Figure 2:
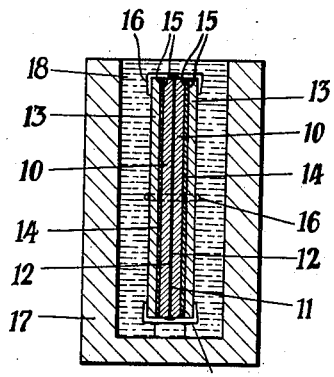
Figure 3:
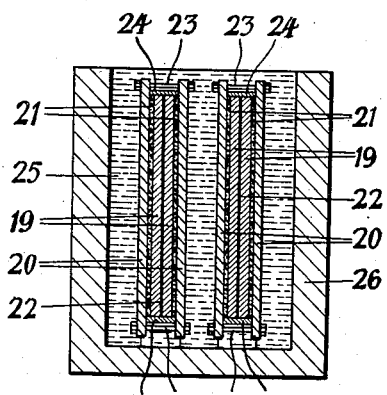

Figs. 2 and 3 are similar views showing alternative forms.

In Fig. 1 two corrosion resisting metal bodies 2 which have first been placed together with a separating material 3 between their juxtaposed cleaned surfaces 4 and the edges preferably sealed at 5 are placed in a hollow body 6 closed at the bottom and containing at least sufficient powdered bonding material 7 to fill, when melted, the space between the bodies 2 and the hollow body 6. The composite assembly so defined is then placed in a mould 8 in spaced relation thereto and molten metal 9 is cast completely about the said assembly so as to heat it and melt the bonding material 7 whereby to bond the corrosion resisting bodies 2 to the hollow body 6 and become part of the resultant compound product which has a parting plane resulting from the non-bonded surfaces 4 and which is adapted to be subsequently divided at said parting plane after removal of the sealed edges 5 to form a plurality of compound metal products each having a corrosion resisting metal surface.

In Fig. 2 which illustrates another method of producing a plurality of compound metal bodies two corrosion resisting metal bodies 10 with separating material 11 between their juxtaposed cleaned surfaces 12 the exposed edges of which may be sealed, have two further metal bodies 13 placed one to each of their remote surfaces with a sheet of manganiferous bonding material 14 at the interfaces 15. The composite assembly so defined is held together by clamps 16 and placed in a mould 17 in spaced relation thereto and molten metal 18 is cast completely about said assembly to become part thereof and resulting in a compound product which has a parting plane formed by the non-bonded surfaces 12 along which parting plane the product is subsequently divided to form a plurality of compound metal products each having a corrosion resisting metal surface.

Fig. 3 illustrates a slight modification of the method depicted in Fig. 2 in that the assembly of juxtaposed corrosion resisting metal bodies 19, outer bodies 20, bonding material 21 and separating material 22 are held together by bolts 23 passing through projecting portions of the outer bodies 20 and metal strips 24 are included in the assembly to cover the exposed edges at the joint of the juxtaposed bodies 19 to prevent ingress of molten metal 25 when cast in the mould 26 about the said assembly. As is shown, a number of separate assemblies may be inserted in a mould.

In all the foregoing methods illustrated pressure is applied to the products either whilst hot from the process or the products may be allowed to cool, be subsequently reheated and then subjected to pressure.

It is to be understood that in the application of pressure to the product the said pressure may be that resulting from a mechanical operation such as rolling or forging for reducing the product to smaller dimensions.

The division of the product at the parting plane is preferably effected after the product has been reduced to smaller dimensions.

What I claim and desire to secure by Letters Patent is:—

1. Process for the manufacture of a compound metal body adapted to be subsequently worked which consists in placing a separating material between the juxtaposed faces of two bodies, applying to each of the remote surfaces of the bodies a further metal body, interposing at the interfaces of the initial bodies and the further bodies a metallic bonding material having a lower melting point than that of said bodies and effecting a bond between the initial bodies and the further bodies by enveloping the resultant assembly with molten metal and to autogenously weld said molten metal to said assembly.

2. The process according to claim 1 whereby the bonding material comprises manganese.

3. The process according to claim 1 wherein the bonding material comprises manganese and an element selected from the group consisting of nickel, cobalt, chromium and iron.

4. The process according to claim 1 which includes applying pressure to the resultant product of the initial bodies, the further bodies and the enveloping cast metal.

5. The process according to claim 1 wherein the bonding material comprises manganese and which includes applying pressure to the resultant product of the initial bodies, the further bodies and the enveloping cast metal.

6. The process according to claim 1 wherein the bonding material comprises manganese and an element selected from the group consisting of nickel, cobalt, chromium and iron and which includes applying pressure to the resultant product of the initial bodies, the further bodies and the enveloping cast metal.

7. The process according to claim 1 which includes applying pressure to the resultant product of the initial bodies, the further bodies and the enveloping cast metal and then dividing the resultant product at the juxtaposed faces having the separating material therebetween

FREDERICK FELIX GORDON.